May 8, 1928.
H. A. McCREA
1,669,097
CONTROL OF ELECTRIC CIRCUITS
Filed July 28, 1927
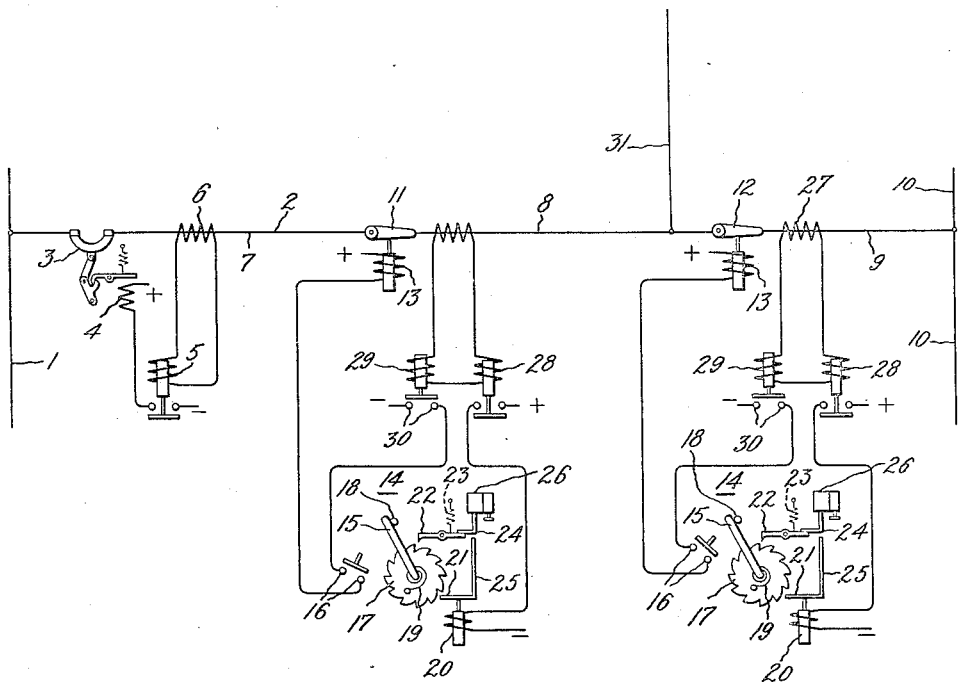
Inventor:
Hugh A. McCrea,
by *Alexander S. ____*
His Attorney.

Patented May 8, 1928.

1,669,097

UNITED STATES PATENT OFFICE.

HUGH A. McCREA, OF SCHENECTADY, NEW YORK, ASSIGNOR TO GENERAL ELECTRIC COMPANY, A CORPORATION OF NEW YORK.

CONTROL OF ELECTRIC CIRCUITS.

Application filed July 28, 1927. Serial No. 209,126.

My invention relates to improvements in the control of electric circuits and more particularly to the disconnection of a faulty portion of a circuit whereby to provide a maximum of service for a minimum expenditure on equipment.

In certain service, such, for example, as so-called farm or rural lines supplying sparsely settled territory where the load is widely distributed, the question of whether service shall be given at all is a purely economic one involving a nicety of balance between expenditure for equipment and probable return. While continuity of service is naturally desired, the dictates of the economic situation forbid putting into the protective apparatus the outlay which installations in densely settled territory warrant. Nevertheless it is desirable to have the necessary protection with the maximum continuity of service commensurate with the equipment expenditure at which any service at all is warranted. An object of my invention is to provide for such situations an improved arrangement for the control and protection of electric lines, such for example as radial feeders, so as to keep the equipment cost within economic bounds and yet to obtain the maximum continuity of service commensurate with such cost without sacrificing the desired protection.

My invention will be better understood from the following description when considered in connection with the accompanying drawing and its scope will be pointed out in the appended claims.

In the single figure of the accompanying drawing, a source such as a bus 1 in a distributing station is arranged to be connected to a circuit 2 by suitable circuit interrupting means such as a circuit breaker 3. This, as shown, is of the latched closed type and is provided with a trip coil 4 which is arranged to be energized on the occurrence of abnormal conditions. For this purpose any suitable means such as an over-current relay 5 connected to be energized from the circuit 2 as, for example, through a current transformer 6 may be used. As far as my invention is concerned, the circuit breaker 3 may be power or manually operated for closing as desired or it may be provided with a suitable automatic reclosing arrangement.

One such arrangement is disclosed, for example, in United States Letters Patent 1,544,536 to Glenn E. Stewart, dated June 30, 1925.

In accordance with my invention, the circuit 2 is arranged to be divided into sections 7, 8, 9 from any one or more of which loads may be taken as indicated by the lines 10 extending from the section 9. For sectionalizing the circuit 2, I provide at spaced points of the circuit switches 11, 12 which in accordance with my invention are not designed to interrupt the circuit current and are therefore not as costly as devices like circuit breakers. The switches 11, 12 may be of any suitable type having the desired current carrying capacity, such as disconnecting switches and are arranged to be opened by any suitable means such as a solenoid 13.

In order to control the switches 11, 12 on the occurrence of abnormal circuit conditions so as to disconnect the faulty portion of the circuit, I provide means operative in response to such conditions to effect the opening of the switch nearest to and on the source side of the fault causing the abnormal condition. As shown, this means comprises a device 14 associated with each of the switches 11, 12 and arranged to be given an impulse on each occurrence of an abnormal condition, the number of impulses given to the devices to effect the opening of the respective switches decreasing as the distance between the switch and the circuit breaker 3 increases. The device 14 may be of the so-called notching relay type and as illustrated comprises a contact controlling member 15 arranged to control contacts 16 in the circuit of the switch opening solenoid 13. The member 15 is mounted on a toothed or notched rotatable element 17 and biased against a stop 18 by suitable means such as a spring 19. For giving the impulses to the element 17, an electromagnet 20 having a projection 21 on its armature is arranged on each energization to engage and advance the element 17 one notch. After being advanced, the element 17 is held against its bias by a pawl 22 which is biased to the holding position as by a spring 23. In certain cases, as for example when the circuit breaker 3 is arranged to be reclosed on a faulty condition one or more times within a predetermined time interval, the device 14 may be made self-resetting. For this purpose there may be provided suitable means arranged to release the pawl 22 within a predetermined time after the first impulse has been given to the element 17. This means as shown comprises a member 24 normally engaging the pawl 22 and restraining it from the holding position against the bias of its spring 23. On energization of the electromagnet 20, the member 24 is moved out of the path of movement of the pawl 22 by a projection 25 on the armature of the electromagnet 20. The arm 24 is prevented from returning for the desired time interval by suitable means such as a dash-pot 26. While the electromagnet 20 may be connected to be energized directly from the circuit in response to an abnormal condition as by a current transformer 27, I may use a separate device to control it in response to abnormal conditions. As shown this comprises an overcurrent relay 28 whose normally open contacts are in the circuit of the winding of the electromagnet 20.

In order to prevent the opening of the switches 11, 12 on a line circuit, that is, when the circuit 2 is energized, I provide means arranged to cooperate with the device 14. As shown this means comprises an undercurrent relay 29 whose contacts 30 are arranged in series with the contacts 16 of the device 14 in the circuit of the solenoid 13. When the circuit 2 is energized by current above the predetermined value for which the relay 29 is set to pick-up it will open its contacts, but whenever the circuit breaker 3 is opened or the circuit current is below such predetermined value it will close its contacts 30.

While in the illustrated embodiment of my invention but two section switches 11, 12 are shown of which the switch 12 is arranged to be operated in response to one impulse of its associated device 14 and the switch 11 in response to two impulses of its associated device 14, it will be understood that any suitable number of section switches may be employed and as the source is approached the number of impulses necessary to effect the opening of a switch increases. It is also to be understood that branch lines such as 31 may be taken off from any section such as 8 and these branch lines may in turn be provided with apparatus similar to that installed at the section points of the circuit 2. In case of fault only the switches between the fault and the circuit breaker 3 will be operated.

If the parts are positioned as shown in the drawing and a fault should occur for example on section 9 or one of the lines 10 connected thereto causing sufficient current flow to operate the relays 5 and 28, then the opening of the circuit breaker 3 will be effected and each of the devices 14 will be given an impulse, but only the device 14 associated with the switch 12 will close its contacts 16. Since the circuit breaker 3 is open, the under-current relays 29 have dropped out thereby closing their contacts 30. Consequently the circuit of the solenoid 13 of switch 12 is completed and the opening of this switch is effected. On reclosure of the circuit breaker 3, service is restored to that part of the circuit 2 which is in sound condition. If the fault were on section 8, the first reclosure of the circuit breaker 3 would restore the abnormal condition, unless the fault has disappeared in the meantime, and the cycle above described would be repeated for the switch 11 and others closer to the circuit breaker, but the opening of the switch 11 would be effected. It is here assumed that the reset feature of the device 14 is either not provided or the reclosure is made within the time limit of the dash-pot 26. In any case on a radial feeder service is maintained on all sections of the circuit between the source and the faulty section, the number of reclosures of the circuit breaker required to restore service to the sound sections being greater the closer the fault is to the source.

Although I have shown and described my invention in considerable detail, I do not wish to be limited to the exact arrangement shown, but seek to cover in the appended claims all those modifications that fall within the true spirit and scope of my invention.

What I claim as new and desire to secure by Letters Patent of the United States is:

1. In combination, a source of electricity, a circuit, a circuit breaker for connecting the circuit to the source, switches in said circuit at spaced points thereof and means operative on the occurrence of abnormal circuit conditions to effect the opening of the switch nearest to and on the source side of a fault causing an abnormal circuit condition comprising a device associated with each switch and arranged to be given an impulse on each occurrence of the abnormal condition, the number of impulses given to the devices to effect the opening of the respective switches decreasing as the distance between the switch and the circuit breaker increases, and a cooperating electroresponsive device associated with each switch for preventing the opening thereof while the circuit is energized.

2. In combination, a source of electricity, a circuit, a circuit breaker for connecting the circuit to the source, means operative on the occurrence of abnormal circuit conditions to effect the opening of the circuit breaker, switches in said circuit at spaced points thereof, and means operative on the occurrence of abnormal circuit conditions to effect the opening of the switch nearest to and on the source side of a fault causing an abnormal condition when the circuit breaker is open comprising a device associated with each switch and arranged to be given an impulse on the occurrence of the fault and each time the circuit breaker is reclosed on the fault, the number of impulses given to the devices to effect the opening of the respective switches decreasing as the distance between the switch and the circuit breaker increases.

3. In combination, a source of electricity, a circuit, a circuit breaker for connecting the circuit to the source, switches in said circuit at spaced points thereof, and means operative on the occurrence of abnormal circuit conditions to effect the opening of the switch nearest to and on the source side of a fault causing an abnormal condition including a device associated with each switch and arranged to be given an impulse on each occurrence of the abnormal condition, the number of impulses given to the devices to effect the opening of the respective switches decreasing as the distance between the switch and the circuit breaker increases.

4. In combination, a source of electricity, a circuit, a circuit breaker for connecting the circuit to the source, switches in said circuit at spaced points thereof, and means operative on the occurrence of abnormal circuit conditions to effect the opening of the switch nearest to and on the source side of a fault causing an abnormal condition when the circuit breaker is open including a device associated with each switch and arranged to be given an impulse on each occurrence of the abnormal condition, the number of impulses given to the devices to effect the opening of the respective switches decreasing as the distance between the switch and the circuit breaker increases.

5. In combination, a source of electricity, a circuit, a circuit breaker for connecting the circuit to the source, means comprising an over-current relay for effecting the opening of the circuit breaker, switches in said circuit at spaced points thereof, and means operative on the occurrence of a fault to effect the opening of the switch nearest to and on the source side of the fault comprising a device associated with each switch and arranged to be given an impulse on the occurrence of the fault and each time the circuit breaker is reclosed on the fault, means comprising an over-current relay for effecting the actuation of said device, and means for preventing the opening of the switch while the circuit is energized comprising an under-current relay arranged to cooperate with said device to effect the opening of the switch after the device has been given a predetermined number of impulses.

6. In combination, a source of electricity, a circuit connected to the source, switches in said circuit at spaced points thereof, and means operative on the occurrence of abnormal circuit conditions to effect the opening of the switch nearest to and on the source side of a fault causing an abnormal circuit condition comprising a device associated with each switch and arranged to be given an impulse on each occurrence of the abnormal condition, a relay responsive to the condition of the circuit for effecting the actuation of said device, and a relay associated with each switch for preventing the opening thereof while the circuit is energized and arranged to cooperate with said device to effect the opening of the switch after the device has been given a predetermined number of impulses.

In witness whereof I have hereunto set my hand this 27th day of July, 1927.

HUGH A. McCREA.